July 30, 1940.

C. H. SUTHERLAND 2,209,361

BRUSH HOLDER MOUNTING

Filed March 21, 1939

WITNESSES:

INVENTOR
Carl H. Sutherland.
BY
ATTORNEY

Patented July 30, 1940

2,209,361

UNITED STATES PATENT OFFICE 2,209,361

BRUSH HOLDER MOUNTING

Carl H. Sutherland, Wilkinsburg, Pa., assignor to Westinghouse Electric & Manufacturing Company, East Pittsburgh, Pa., a corporation of Pennsylvania Application March 21, 1939, Serial No. 263,165

4 Claims. (Cl. 171—324)

My present invention has particular relation to brush holder mountings which have been designed for auxiliary power sets for use on aircraft where particularly exacting requirements are encountered in the matter of reducing weight to an absolute minimum, and in the matter of guarding against difficulties due to vibration.

One of the objects of my invention is to provide a dynamo-electric machine having a novel brush holder mounting which will provide an insulating support, having adequate surface-creepage distances, for the respective brushholders of different polarities.

A more specific object of my invention is to provide a brush holder for supporting a pair of brushes at circumferentially spaced points, said brushes bearing on a common cylindrical rotating current-collecting part, and said brushes being displaced from each other, in a circumferential distance, sufficiently far so that a vibration in such a direction as to strongly tend to cause one of the brushes to jump out of contact with its cooperating cylindrical surface would not be in the most effective direction for simultaneously jarring the other brush, of the same brush holder, out of proper electrical contact with the cooperating rotating cylindrical current-collecting member.

Figure 1:
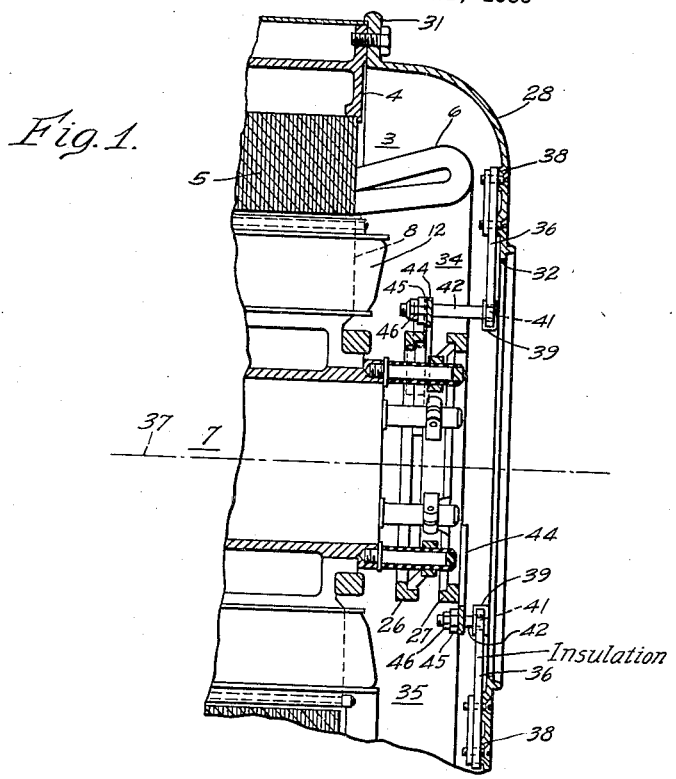
Figure 2:
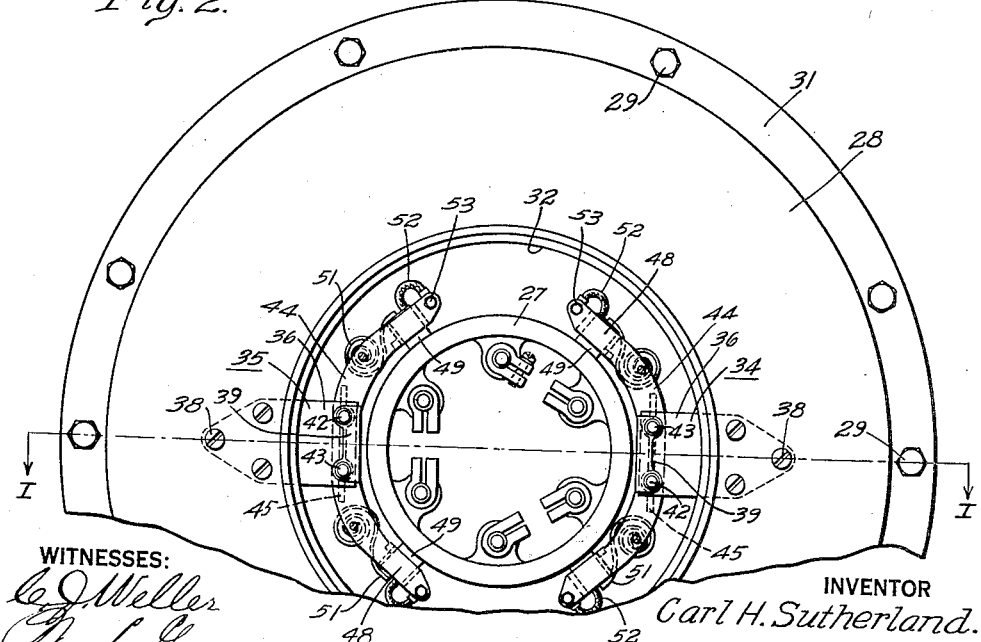

With the foregoing and other objects in view, my invention consists in the constructions, combinations, methods and parts hereinafter described and claimed, and illustrated in the accompanying drawing, wherein Figure 1 is a horizontal longitudinal sectional view through a generator embodying my invention, the section plane being indicated at I—I in Fig. 2; and Fig. 2 is an end view thereof.

My invention is shown applied to an alternating-current generator of moderately high frequency comprising: a stator member 3 having a frame 4, a core 5 and alternating-current windings 6; and a rotor member 7 having a plurality of salient poles 8, excited by exciting windings 12 which are energized by means of two cylindrically surfaced current-collecting rings 26 and 27. The precise details of these parts are not essential to my present invention. The details of the rotor-member construction constitute the subject matter of a copending application of Herbert G. Jungk, Serial No. 263,160, filed March 21, 1939, assigned to the Westinghouse Electric & Manufacturing Company. The collector-ring construction and mounting constitute the subject matter of another copending application of H. G. Jungk, Serial No. 263,161, filed March 21, 1939, also assigned to the Westinghouse Electric & Manufacturing Company.

The generator is provided with an end-bell or end-bracket 28 which is secured to the stator frame 4 by any suitable means as indicated at 29. In keeping with the requirements for a minimum weight, the stator frame 4 and the end-bracket 28 are made of a light-weight metal or alloy, and are made physically as small as possible. To this end, the outer end of the bracket 28 is flattened, as indicated at 31, so that the bracket will not be any longer than necessary, in the axial direction. The end-bracket 28 is provided with a large central perforation 32 for providing convenient access to the current-collecting parts. The hole or perforation 32 is normally closed by a removable cover which has been omitted for clearness of illustration.

The current-collecting equipment for energizing the exciting windings 12 consists not only of the two collector-rings 26 and 27, but also two brush holder mountings 34 and 35, one for each collector-ring. In accordance with my present invention, each of the brush holder mountings 34 and 35 comprises an insulating supporting plate 36 which is made of a suitable insulating sheet-material, and which is disposed in a plane substantially at right angles to the axis 37 of the rotor member. Each supporting plate 36 has its radially outermost end in contact with, and supported against, the inner surface of the end-bracket 28, as indicated at 38. The radially innermost end of each of the insulating supporting plates 36 is capped or strengthened by means of a U-shaped metal piece 39 which tightly straddles the insulating supporting plate 36. The radially innermost end of each supporting plate 36, and also the flanges of the U-shaped piece 39, are provided with a plurality of perforations 41 in which are thrust the ends of a plurality of metal supporting pins 42, each of which has an end securely fastened in, and rigidly supported by, one of said perforations 41, the pins being held therein in any suitable manner, as by means of riveted ends 43.

The free ends of the pins 42 of each of the brush holder mountings 34 and 35 are secured to the center of an arcuately extending brush holder 44 which is stamped out of a piece of thin sheet-metal, the central portion of which is reenforced by means of a strengthening or reenforcing member 45 of thicker sheet-metal. The central portion of the brush holder 44, with its reenforcement 45, is preferably removably secured to the ends of the supporting pins 42, by means of nuts 46.

It will be noted that the pins 42 of the two brush holder mountings 34 and 35 are of different lengths, so that, while each of the brush holders 44 is held in axially spaced relation with respect to its insulating supporting plate 36, the brush holder 44 of the brush holder mounting 34 is disposed over, but radially spaced from, the inner collector-ring 26, while the brush holder 44 of the other brush holder mounting 35 is disposed over, but radially spaced from, the outer collector-ring 27.

Each of the brush holders 44 extends, in a circumferential direction, for a considerable distance on each side of its central supporting point, where it is secured to the supporting pins 42. Near each end of each brush holder 44, I provide a brush box 48, holding a brush 49 which is yieldably pressed against its associated collector ring 26 or 27 by means of a spring-finger 51. As is customary, each brush 49 is provided with a pigtail or shunt 52 which, in the illustrated embodiment of my invention, is grounded at 53 on the brush holder 44, so that each brush holder serves as one of the terminals of the exciting winding 12.

It will be noted that each of the insulating supporting plates 36 provides an ample surface-creepage distance or spacing between the supporting pins 42, which are at the potential of the associated brush holder 44, and the end-bracket 28, which is at ground potential, said creepage-distance being suitable, of course, for the voltage of the brush holder. It will be further noted that my utilization of the stiff insulating plates 36, which are firmly and adequately bolted to the end-bracket 28, and which extend far enough from said bracket to provide the adequate creepage-distance just mentioned, constitutes a particularly desirable brush holder mounting-means for an aircraft generator in which the weight must be a minimum, but in which a rigid brush holder support is particularly necessary because of the excessive vibrations to which the whole system is subjected.

It will be further noted that my provision of arcuately extending brush holders 44, each of which supports two brushes 49, further aids in securing substantially sparkless current-collection in spite of the severe vibration problem. This is brought about, because both of the brushes 49 of each brush holder 44 bear radially upon the same collector-ring 26 or 27, as the case may be, but these two brushes engage the collector-ring at different points which are widely separated circumferentially with respect to the collector-ring, so that, when there is a vibration or jerk which happens to be in a plane coincident with the radial line through one of the brushes 49, so as to strongly tend to jar said brush 49 momentarily out of contact with its collector-ring, the radial line through the other brush 49 will be of the order of 90° displaced from the first brush, or even more than 90° displaced therefrom, so that the same jar which loosened the first brush will not loosen the second brush from contact with the collector-ring at the same moment.

Good current-collection is also achieved by making the brushes 49 and the spring fingers 51 as light as possible, so that these parts will have a minimum inertia, enabling them to follow any irregularities in the cylindrical surface of the respective collector-rings 26 and 27 with the greatest possible fidelity.

While I have described and illustrated my invention in connection with a single preferred form of embodiment, it will be understood that various changes and modifications may be made by those skilled in the art without departing from the essential spirit of my invention. I desire, therefore, that the appended claims shall be accorded the broadest construction consistent with their language and the prior art.

I claim as my invention:

1. A plurality of brush holder mountings, of a plurality of different polarities, for a dynamo-electric machine having a stator member with an end-bracket, and a rotor member with one or more cylindrical current-collecting parts disposed within said end-bracket, each brush holder mounting comprising an insulating supporting plate, means for rigidly securing said supporting plate against an inner surface of said end-bracket, said supporting plate extending in a plane substantially at right angles to the axis of the rotor member, a plurality of supporting pins rigidly carried by said supporting plate and extending in a direction at substantially right angles thereto, and a brush holder carried by said supporting pins and in turn carrying one or more brushes in engagement with a cylindrical current-collecting part, said supporting plate providing an insulating creepage-distance, suitable for the voltage of the brush holder, between said pins and said end-bracket.

2. The invention as defined in claim 1, characterized by each insulating supporting plate having its radially outermost end in contact with, and supported against, an inner surface of said end-bracket, and further characterized by each insulating supporting plate having a U-shaped metal piece tightly straddling its radially innermost end, said supporting pins being supported in perforations extending through both flanges of the U-shaped piece.

3. A plurality of brush holder mountings, of a plurality of different polarities, for a dynamo-electric machine having a stator member with an end-bracket, and a rotor member with one or more cylindrical current-collecting parts disposed within said end-bracket, each brush holder mounting comprising an insulating supporting plate, means for rigidly securing said supporting plate against an inner surface of said end-bracket, said supporting plate extending in a plane substantially at right angles to the axis of the rotor member, a plurality of supporting pins rigidly carried by said supporting plate and extending in a direction at substantially right angles thereto, an arcuately extending metallic brush holder centrally supported by said supporting pins in spaced relation to said supporting plate and in spaced relation to a cylindrical current-collecting part, a current-collecting brush supported on each end of said arcuately extending brush holder, and means for pressing each brush in yielding engagement with said cylindrical current-collecting part, said supporting plate providing an insulating creepage-distance, suitable for the voltage of the brush holder, between said pins and said end-bracket.

4. A plurality of brush holder mountings, of as many different polarities, for a dynamo-electric machine having a stator member with an end-bracket, and a rotor member with the same member of longitudinally spaced current-collecting rings as the number of brush holder mountings, the plurality of current-collecting rings being disposed at the end of the rotor member which is covered by said end-bracket, and a plurality of insulating supporting plates, one for each brush holder mounting, disposed in spaced circumferential positions within said end-bracket, means for rigidly securing each supporting plate against an inner surface of said end-bracket, said supporting plate extending in a plane substantially at right angles to the axis of the rotor member, a plurality of supporting pins rigidly carried by said supporting plate and extending in a direction at substantially right angles thereto, an arcuately extending metallic brush holder centrally supported by said supporting pins in spaced relation to said supporting plate and in spaced relation to a cylindrical current-collecting ring, a current-collecting brush supported on each end of said arcuately extending brush holder, and means for pressing each brush in yielding engagement with said cylindrical current-collecting ring, said supporting plate providing an insulating creepage-distance, suitable for the voltage of the brush holder, between said pins and said end-bracket, and the supporting pins for different brush holders being of different lengths so that each of said brush holders is operatively associated with a different current-collecting ring.

CARL H. SUTHERLAND.